(No Model.)

P. K. STERN.
CAMERA.

No. 571,806. Patented Nov. 24, 1896.

Witnesses
John L. Tunison
C. W. Stern

Inventor
Philip K. Stern

UNITED STATES PATENT OFFICE.

PHILIP K. STERN, OF ST. LOUIS, MISSOURI, ASSIGNOR TO THE STERN MANUFACTURING COMPANY, OF SAME PLACE.

CAMERA.

SPECIFICATION forming part of Letters Patent No. 571,806, dated November 24, 1896.

Application filed February 10, 1896. Serial No. 578,826. (No model.)

*To all whom it may concern:*

Be it known that I, PHILIP K. STERN, a citizen of the United States, residing in the city of St. Louis and State of Missouri, have invented a new and useful Photographic Camera, of which the following is a specification.

My improvements relate to photographic cameras having an internal reflecting-prism for erecting the image while adjusting and focusing the same prior to the exposure of the plate; and the object of my invention is to facilitate the adjustment of the camera and render more clearly to the operator the view to which the sensitive film is about to be exposed to a greater extent than any other means of which I am at present aware. I attain this object by the mechanism illustrated in the accompanying drawings, in which—

Figure 1:
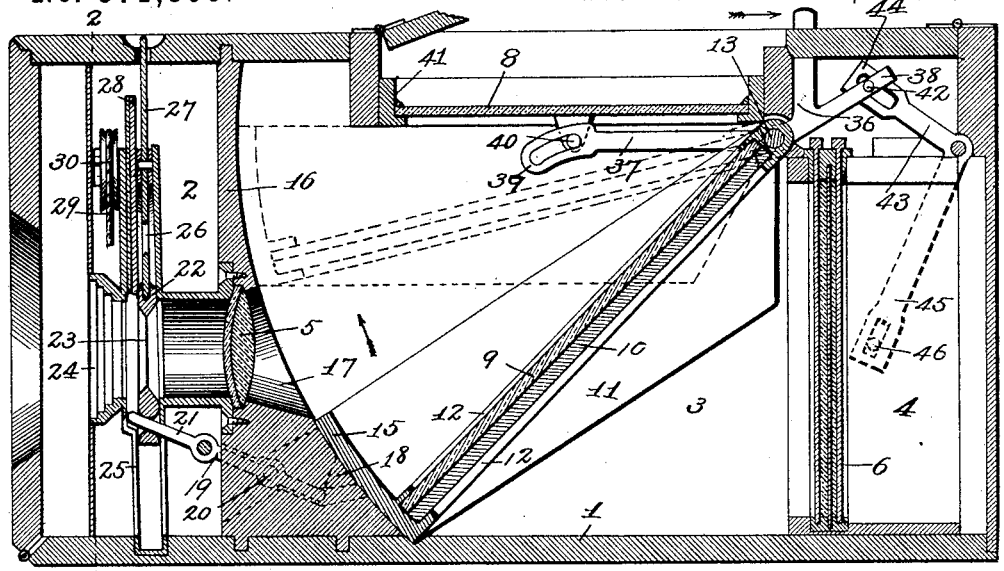
Figure 2:
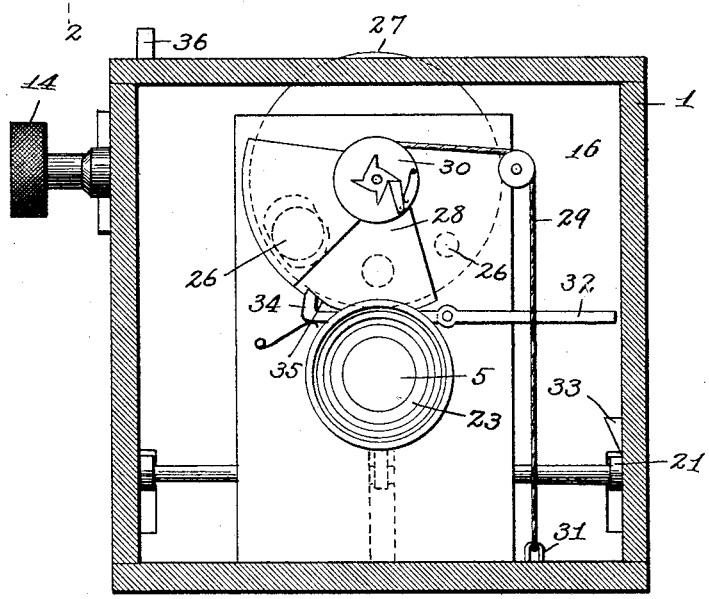

Figure 1 is a longitudinal sectional view of my improved camera. Fig. 2 is a section on the line 2 2, Fig. 1.

Similar numerals refer to similar parts throughout both views.

The box 1, divided into the compartments 2, 3, and 4, with a lens 5, plate-holder 6, focusing-screen 8, and mirror 9 constitute the principal parts of the camera. To the back of the mirror 9 is secured the rigid board 10, to the sides of which are fastened the walls 11. At opposite ends of the board and continuing around the sides is secured the frame 12, which holds the mirror in position on the board 10, which latter is adapted to protect the mirror against breakage by concussion or jar. The mirror, together with its back board, swings about a pivot 13, operated from the outside by a knob 14, secured to the frame 12, and when in its normal position, as shown in Fig. 1, forms a reflecting-prism. To the opposite end of the mirror-board the segmental shutter 15 is secured. This lies closely to the lens-plate 16 and is designed to cover the lens-aperture 17 prior to exposing the plate in the holder 6 and uncovering said aperture when it is desired to make an exposure.

When the mirror 9 is in its normal position, as shown in the drawings, the finger 18 engages the lever 19, which is pivoted at 20, throwing the end 21 upward, the effect of which is to raise the diaphragm 22 sufficiently to place the largest stop 23 in position in the lens-tube 24. This diaphragm slides in a suitable guideway 25 and carries the revolving stops 26 in the wheel 27. This wheel projects slightly through the top of the box, so as to be manipulated by the fingers of the operator.

Carried by the diaphragm is the instantaneous shutter 28, (this is an ordinary pivoted spring-press shutter, such as is common on a large number of hand-cameras in use at the present time,) set by a cord 29, running over a pulley 30, which rotates upon a pivot secured to the edge of the diaphragm 27. When the diaphragm is in the position shown, which has assumed the raised position, (by the return of the mirror from a raised position during the previous exposure,) the cord 29, being secured by the staple 31, shall be strained, so as to energize the spring which actuates the shutter 28. Upon raising the mirror 9, however, by rotating it by the knob 14 the finger 18 will allow the lever 19 to descend by its own weight, together with the diaphragm 23, until the trigger 32 shall strike the block 33, the effect of which will be to disengage the end 34 of said trigger from a notch 35 in the shutter, thereby releasing the shutter and making the necessary exposure of the film in the plate-holder 6. It is obvious that as the diaphragm descends the stop 26 will register with the lens 5. By this arrangement of the shutter, mirror, and diaphragm I am enabled to photograph rapidly-moving objects, making the exposure by simply turning the knob 14, which has the effect of making an exposure not only with the mirror-shutter 15, but with an extremely-rapid shutter, if desired, effecting an exposure of the plate or film, which will result in a negative with comparatively no distortion of the image resulting from an instantaneous exposure of a moving object. This could not be obtained by making the exposure with the segmental shutter 15, secured to the end of the mirror, for the reason that the mirror in its swinging movement has its velocity considerably retarded by fanning the inclosed air. Moreover, the exposure would be accompanied by considerable jar, occasioned by the momentum of the moving piece, which necessarily would have to be greater than the instantaneous shutter, and which would also tend to produce a distorted image.

Hinged upon the pivot 13 is the three-armed lever 36, having the arms 37 38. The arm 37 has a slotted head 39, which engages a pin 40, attached to the frame 41 of the ground-glass focusing-screen 8. The arm 38 has a pin 42, engaging a two-armed lever 43 at the head 44. The arm 45 of the lever engages a pin 46, secured to the sliding compartment 4. In the drawings the lever 36 is moved to its extreme limit in one direction—viz., to the left—but by moving it to the right, however, as indicated by the arrow, the arm 37 will raise the focusing-screen 8, and at the same time the arm 38, engaging the lever 43, will move the compartment 4, carrying the plate-holder 6, farther from the lens 5 proportionately. It is obvious that by this arrangement of levers the photographic image which is thrown upon the ground glass 8 (the rays being reflected from the mirror 9) may be focused, while at the same time the film is brought to the proper distance from the lens, whereby when the mirror is raised and the image transferred to the sensitized surface in the plate-holder 6 it shall be transferred in exact focus.

Having fully described my invention, what I claim as new, and desire to secure by Letters Patent of the United States, is—

1. In a photographic camera having an internal mirror normally inclined at an angle to the optical axis of said camera and a focusing-screen set at right angles to the focal plane of said camera, and means for transferring an image from the focusing-screen of said camera to the focal plane thereof; a shutter for controlling the exposure of the sensitized material, and a diaphragm-stop normally out of register with the optical axis of the said camera, said diaphragm-stop to coöperate with said shutter whereby upon the operation of said shutter the diaphragm-stop shall come into register with the optical axis as aforesaid, substantially as described.

2. In a photographic camera having an internal mirror normally inclined at an angle to the optical axis of said camera and a focusing-screen set at right angles to the focal plane of said camera; a shutter for controlling the exposure of the sensitized material, a lever for swinging the aforesaid mirror and suitable power mechanism for operating the said shutter; said power mechanism to be set by the operation of the said lever, substantially as described.

3. In a photographic camera having an internal mirror normally inclined at an angle to the optical axis of said camera and a focusing-screen set at right angles to the focal plane of said camera and means for transferring an image from the focusing-screen of said camera to the focal plane thereof; a diaphragm-stop normally out of register with the optical axis of said camera and a lever for introducing said stop simultaneously with the transfer of the image from the focusing-screen to the focal plane, substantially as described.

4. In a photographic camera having an internal mirror normally inclined at an angle to the optical axis of said camera and a focusing-screen set at right angles to the focal plane of said camera, and means for transferring an image from the focusing-screen of said camera to the focal plane thereof; a diaphragm-stop and means for introducing said diaphragm-stop simultaneously with the transfer of the image from the focusing-screen to the focal plane of said camera and means also for throwing said diaphragm-stop out of register with the optical axis of said camera after said mirror has been swung into a normal position, substantially as described.

5. In a photographic camera having an internal mirror normally inclined at an angle to the optical axis of said camera and a focusing-screen set at right angles to the focal plane of said camera, and means for transferring an image from the focusing-screen of said camera to the focal plane thereof; a lever and a diaphragm and a suitable controlling shutter mechanism both operated by the said lever simultaneously with the transfer of the image, substantially as described.

6. In a photographic camera having an internal mirror normally inclined at an angle to the optical axis of said camera, and a focusing-screen set at right angles to the focal plane of said camera, of a diaphragm carrying a diaphragm-stop and shutter, said diaphragm, diaphragm-stop and shutter being normally out of register with the optical axis of the said camera, and of a common lever to transfer the image from the focusing-screen to the focal plane and introduce the aforesaid diaphragm, diaphragm-stop and shutter to register with the optical axis of said camera, substantially as described.

7. In a photographic camera having an internal mirror normally inclined at an angle to the optical axis of the said camera and a focusing-screen set at right angles to the focal plane of said camera of suitable controlling shutter mechanism for controlling the exposure of the sensitized material and of suitable power-actuating mechanism for operating said shutter, and of a common lever to transfer the image from the focusing-screen to the focal plane and set said controlling shutter mechanism, substantially as described.

8. In a photographic camera having an internal mirror normally inclined at an angle to the optical axis of said camera and a focusing-screen set at right angles to the focal plane of said camera, a shutter for controlling the exposure of the sensitized material, a diaphragm-stop normally out of register with the optical axis of the said camera, suitable power mechanism for operating said shutter, and a common lever to transfer the image from the focusing-screen to the focal plane, and for the introduction of the aforesaid diaphragm-stop to register with the optical axis of said camera and to set the shutter mechanism, substantially as described.

9. In a photographic camera having an internal mirror normally inclined at an angle to the optical axis of said camera, and a focusing-screen set at right angles to the focal plane of said camera, and means for transferring an image from the focusing-screen of said camera to the focal plane thereof, of a lever for swinging the aforesaid mirror, of a diaphragm carrying a shutter, and diaphragm-stops, said diaphragm being adapted to uncover the lens-aperture of said camera, and of a lever adapted to engage said diaphragm actuated by the operation of the aforesaid mirror, whereby, upon the swinging of the said mirror into its normal position, said lever shall throw the said diaphragm so as to uncover said lens-aperture, and whereby upon swinging the mirror out of its normal position said diaphragm shall cover the lens-aperture, substantially as described.

10. In a photographic camera the combination of a box having an internal diagonally-disposed mirror, a plate having an aperture at one end of said box and a lens situated thereat, a receptacle having an opening opposite said aperture being adapted to receive a sensitized material, a focusing-screen located on a side of said box, a diaphragm-stop which shall lie normally out of register with said lens-aperture and a shutter which shall normally uncover said lens-aperture, of a lever adapted to swing the aforesaid mirror, said lever to coöperate with the aforesaid diaphragm-stop and aforesaid shutter, substantially as described.

PHILIP K. STERN.

Witnesses:
  JOHN L. TUNISON,
  E. W. STERN.